(12) United States Patent
Mott et al.

(10) Patent No.: US 10,610,840 B2
(45) Date of Patent: Apr. 7, 2020

(54) MIXING ASSEMBLY

(71) Applicant: DYNAMIX AGITATORS INC., Richmond (CA)

(72) Inventors: Shaun Mott, Richmond (CA); Jack Szu-Shen Chen, Langley (CA)

(73) Assignee: DYNAMIX AGITATORS INC., Richmond, British Columbia (CA)

( * ) Notice: Subject to any disclaimer, the term of this patent is extended or adjusted under 35 U.S.C. 154(b) by 188 days.

(21) Appl. No.: 15/578,939

(22) PCT Filed: Jun. 1, 2016

(86) PCT No.: PCT/CA2016/050623
§ 371 (c)(1),
(2) Date: Dec. 1, 2017

(87) PCT Pub. No.: WO2016/191874
PCT Pub. Date: Dec. 8, 2016

(65) Prior Publication Data
US 2018/0169595 A1 Jun. 21, 2018

Related U.S. Application Data

(60) Provisional application No. 62/169,470, filed on Jun. 1, 2015.

(51) Int. Cl.
*B01F 7/00* (2006.01)
*B01F 7/16* (2006.01)
(Continued)

(52) U.S. Cl.
CPC ........ *B01F 7/00725* (2013.01); *B01F 7/1695* (2013.01); *B01F 7/22* (2013.01);
(Continued)

(58) Field of Classification Search
CPC ...... B01F 7/00725; B01F 7/1695; B01F 7/22; B01F 15/0048; B01F 15/00538; B01F 15/00681; B01F 15/00831; B01F 2015/00603; B01F 2015/00649; F16D 1/108; F16D 3/2052
See application file for complete search history.

(56) References Cited

U.S. PATENT DOCUMENTS 4,198,373 A 4/1980 Kropp et al.
4,781,468 A 11/1988 Herfeld
(Continued)

OTHER PUBLICATIONS

International Search Report issued in counterpart International Application No. PCT/CA2016/050623 dated Aug. 18, 2016.
(Continued)

*Primary Examiner* — Anshu Bhatia
(74) *Attorney, Agent, or Firm* — Venable LLP; Michele V. Frank (57) ABSTRACT

A mounting assembly is provided, including: a drive coupler shaped to engage a coupling member on a shaft positionable within a container defining an aperture to allow passage of the shaft; and a funnel positioned within the aperture to receive the drive coupler and guide the drive coupler to the coupling member. The assembly provides ergonomic advantages as the user is not required to lift the drive to reach the aperture.

16 Claims, 7 Drawing Sheets

(51) Int. Cl.
*F16D 3/205* (2006.01)
*B01F 7/22* (2006.01)
*B01F 15/00* (2006.01)
*F16D 1/108* (2006.01)

(52) U.S. Cl.
CPC .... *B01F 15/0048* (2013.01); *B01F 15/00538* (2013.01); *B01F 15/00681* (2013.01); *B01F 15/00831* (2013.01); *F16D 1/108* (2013.01); *F16D 3/2052* (2013.01); *B01F 2015/00603* (2013.01); *B01F 2015/00649* (2013.01)

(56) References Cited

U.S. PATENT DOCUMENTS

| 4,813,786 | A | * | 3/1989 | LeMaster | B01F 7/1695 366/251 |
|---|---|---|---|---|---|
| 7,318,668 | B2 | | 1/2008 | Bielozer | |
| 7,874,719 | B2 | | 1/2011 | Markle et al. | |
| 8,118,478 | B2 | | 2/2012 | Mott et al. | |
| 2013/0188441 | A1 | | 7/2013 | Markle et al. | |

OTHER PUBLICATIONS

Written Opinion of the International Searching Authority issued in counterpart International Application No. PCT/CA2016/050623 dated Aug. 18, 2016.

\* cited by examiner

MIXING ASSEMBLY

RELATED APPLICATIONS

This application claims the benefit of U.S. Provisional Patent Application No. 62/169,470 filed Jun. 1, 2015, which is hereby incorporated by reference in its entirety.

FIELD OF THE INVENTION

The present invention relates generally to fluid mixing units. More particularly the invention relates to a means of delivering power to a mixing unit in a container.

BACKGROUND

Many industries transport, store, mix, process and/or discharge fluids from commercial bulk containers made of plastic or metal, commonly known in the trade as "tote containers", "bulk containers", or "intermediate bulk containers" (all herein referred to as "containers"). It is often desirable, and in some cases required, that the fluids stored in such containers be agitated, mixed or blended between the time they are loaded into the containers and the time they are discharged therefrom. To affect the desired mixing it was necessary to open the container and insert a mixing unit with impeller blades. There are, however, several complications with this approach.

Many current mixer designs are a single piece, combining the drive and shaft/impeller for placement on a container. Such combined units are heavy and awkward to install and may require lifting mechanisms or bridges to mount and deliver the mixer into and onto the tote. Such lifting mechanisms are at a permanent location for lifting, and a single person cannot install and remove the mixer.

What is needed is a highly portable mixer which can be installed and removed independent of a lift or additional bracketry and can easily deliver the power drive unit to the mixer without requiring a person to extend their arms to the aperture in the container.

SUMMARY OF THE INVENTION

A mounting assembly for a container is provided, including: a drive coupler shaped to engage a coupling member on a drive shaft; the drive coupler having a groove to engage a locking pin on the coupling member; the drive coupler within a male funnel; a cover for the container, the cover defining an aperture to allow passage of the shaft; a drive shaft partially covered by the drive coupler, the drive shaft rotatable by a motor; and a female funnel positioned within the cover to receive the drive coupler and guide the drive coupler to the coupling member.

The drive coupler may be shaped to be received by the funnel. The drive coupler and motor may be secured to a rocking frame configured to use a surface on the container as a fulcrum. The cover may include a plurality of extensions on an exterior of the cover, and the drive coupler may include a locking member securable to the extensions. The cover may be sized to serve as a guide for positioning of the rocking frame for alignment of the drive coupler and coupling member.

A mounting assembly is provided, including: a drive coupler shaped to engage a coupling member on a shaft; a container, the container defining an aperture to allow passage of the shaft; and a first funnel positioned within the aperture to receive the drive coupler and guide the drive coupler to the coupling member.

The drive coupler may be mounted to a moveable frame. The moveable frame may include means for moving the frame from a first position wherein the drive coupler is not positionable to receive the coupling member to a second position wherein the drive coupler is positionable to receive the coupling member.

The moveable frame may further include an actuator, which when actuated, allows pivoting of the drive coupler. The actuator may be configured to actuate when the drive coupler is positionable to be received by the funnel. The drive coupler may be rotatable by a motor. The frame may include a plurality of concave rollers sized and positioned to roll along at least two spars on the container. The container may include a neck surrounding the aperture. The mounting assembly may include a cover positionable within the aperture. The cover may include an extension on an exterior of the cover, and the drive coupler may include a locking member securable to the extension.

The mounting assembly may include an impeller secured to the shaft. The container may be configured to dissipate or divert electrostatic discharge to ground. The mixer may include a material that does not accumulate an electrostatic discharge. A second funnel sized to fit the first funnel may encompass the drive coupler.

A mounting assembly is provided, including: a drive coupler shaped to engage a coupling member on a shaft positionable within a container, the container defining an aperture to allow passage of the shaft; the drive coupler positioned on a moveable frame moveable from a first position wherein the drive coupler is not positionable to receive the coupling member to a second position wherein the drive coupler is positionable to receive the coupling member; the frame comprising an actuator, which when actuated, allows pivoting of the drive coupler, the actuator actuatable when the drive coupler is pivotably alignable with the coupling member.

The mixing assembly according to the invention allows for single person usage in many circumstances. A user can just pull the drive assembly off (without the agitator segment) allowing for mixing assembly to be installed and removed by a sole person. The user is assisted in delivering the drive to the aperture as the drive weight is borne by the spars or the container.

DETAILED DESCRIPTION

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The term "invention" and the like mean "the one or more inventions disclosed in this application", unless expressly specified otherwise.

The terms "an aspect", "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise. The term "plurality" means "two or more", unless expressly specified otherwise. The term "herein" means "in the present application, including anything which may be incorporated by reference", unless expressly specified otherwise.

The term "e.g." and like terms mean "for example", and thus does not limit the term or phrase it explains.

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. Section 1.72(b) or similar law in other jurisdictions. The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention (s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

As seen in FIGS. 1 through 11, embodiments of the invention are an assembly, generally indicated as 10, for mounting mixing means to a container 6. Mixing assembly 10 includes an "agitator segment" including the cover 3, female funnel 40, shaft 5, impellers, and shaft coupling member 20; a drive assembly including drive 1, male funnel 42, and drive coupler 48.

Mixing means may be of any kind found in the art, and generally include drive 1 or other propulsion device, a rotatable shaft 5, and impellers (not shown) to mix the contents of container 6. In this document, the terms "mixer" and "mixing means" will be used synonymously. Container 6 is preferably made of plastic or steel, and may be any one of the many bulk containers available in the art. Container 6 is shaped to hold large amounts of material, usually fluids. A neck 60 may extend from container 6 and surround an aperture at the top of container 6 through which the interior of container 6 may be accessed.

The assembly includes cover 3 generally shaped to meet with and cover neck 60, and which may be made of a hard rigid material such as hardened plastic. Cover 3, when in position on neck 60, may act as a support for funnel 40. Cover 3 may have an inner diameter almost equal to the outside diameter of neck 60 such that cover 3 can rest securely on top of neck 60. Alternatively, cover 3 may include a plate (not shown), as disclosed in U.S. Pat. Nos. 7,832,923 and 8,118,478.

Cover 3 has an aperture sized to receive funnel 40. Alternatively, funnel 40 may be secured to cover 3 by welding or cover 3 and funnel 40 may be manufactured as a single piece by molding or other means known in the art.

Funnel 40 has a generally conical shape with a greater circumference at its top to receive and guide male funnel 42 and drive coupler 48 to coupling member 20 and thereby engage drive 1 with shaft 5. Female funnel 40 makes it easy for a user to guide drive coupler 48 and male funnel 42. Female funnel 40 is configured to act as a sleeve to guide male funnel 42. The bottom narrower end of funnel 40 is shaped receive shaft 5 and to allow shaft 5 to rotate when engaged with drive coupler 48.

Neck 60 has external screw threads sized and shaped to match internal screw threads of cover 3 and thereby receives cover 3, allowing cover 3 to cover neck 60 by cover 3 engaging the threads on the container neck 60. Cover 3 may include a gasket (not shown) or other means to perform a sealing function.

Mixing shaft 5 is positionable in container 6 though neck 60 and funnel 40 to reach the interior of container 6. Shaft 5 is configured to rotate an impeller secured to shaft 5.

Figure 1:
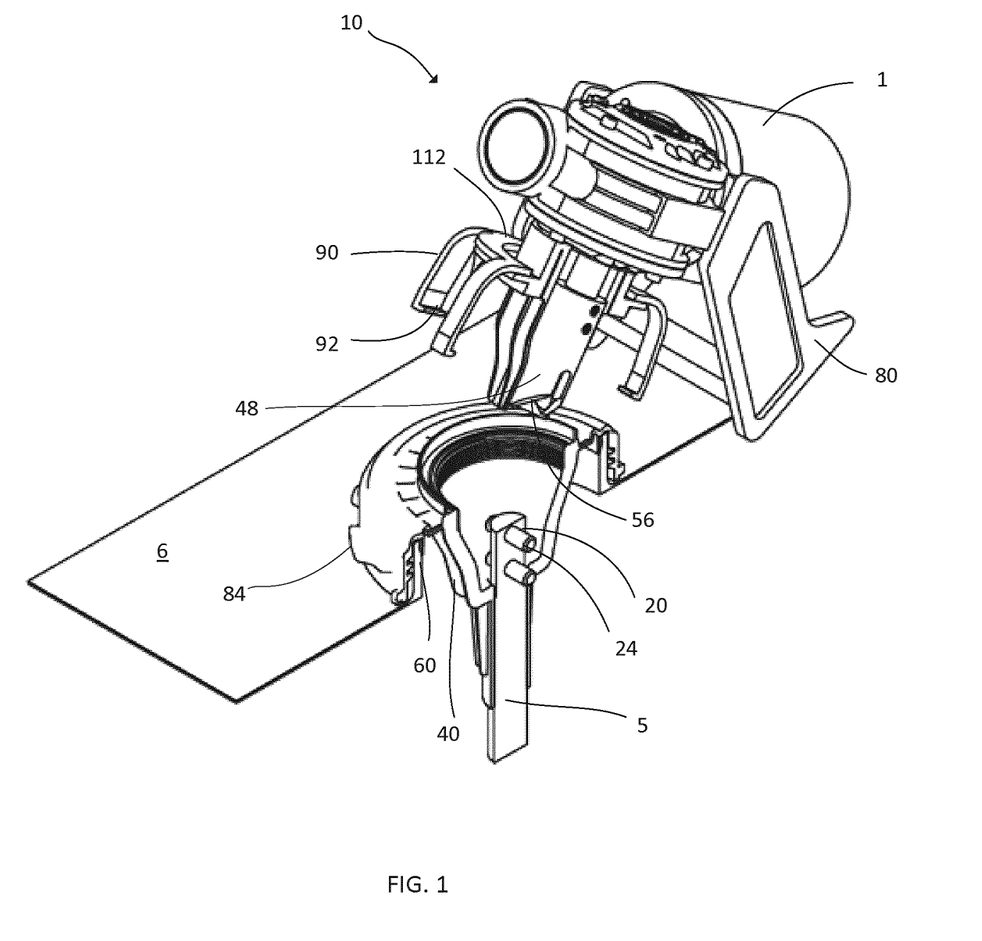
FIG. 1 is a perspective view of an embodiment of an assembly according to the invention.
Figure 2:
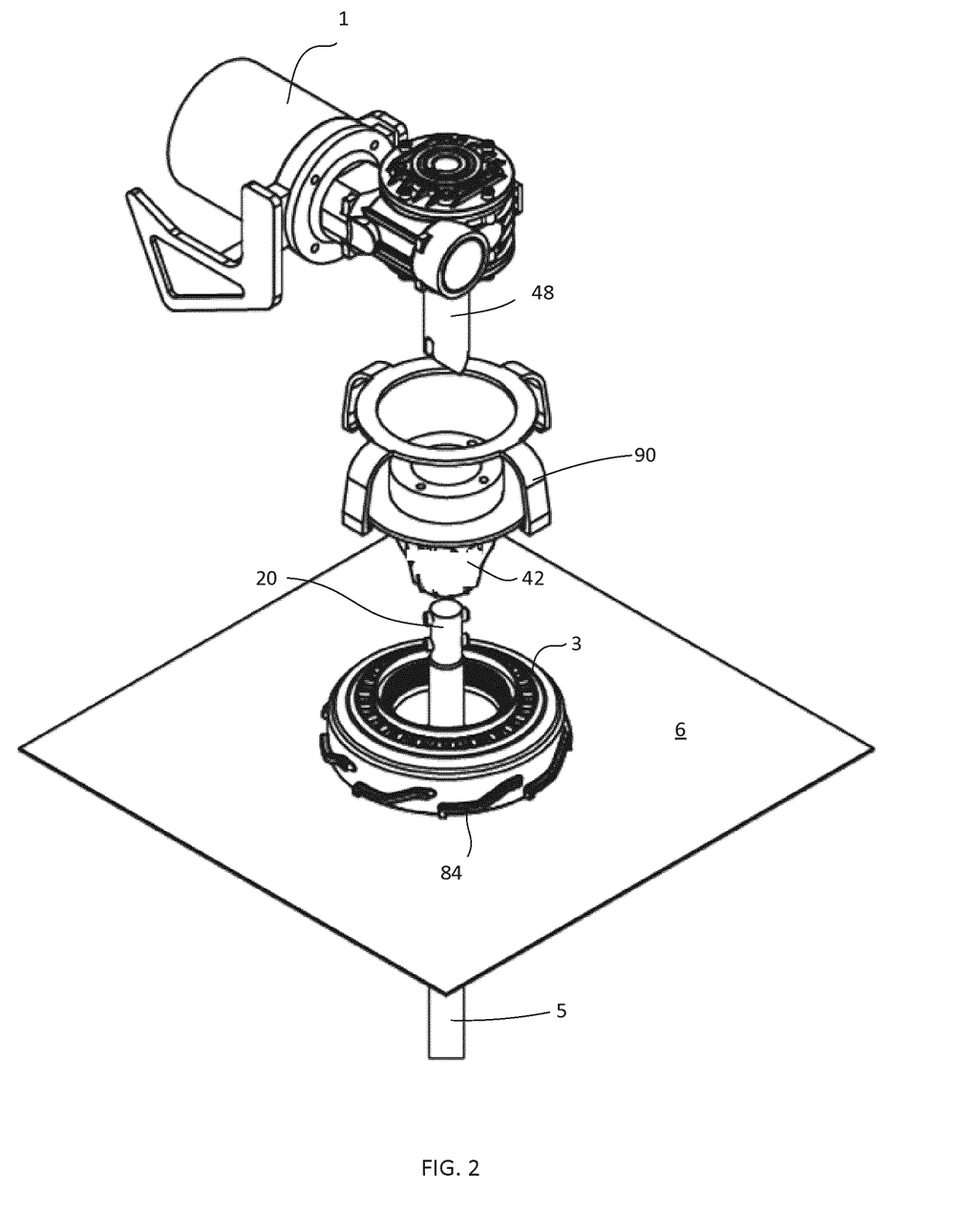
FIG. 2 is a perspective disassembled view thereof.

Drive 1 is detachably secured to the mixing assembly by a coupling assembly. An embodiment of the coupling assembly according to the invention includes coupling member 20, as best seen in FIG. 1, positioned at the top of shaft 5, with drive pins 24 positioned approximately perpendicular thereto; and drive coupler 48. Drive coupler 48 may be a dog coupler including slot 56 for receiving drive pin 24 and thereby to engage shaft 5 for rotation.

Drive coupler 48 extends downwardly from motor 1 and may be configured, when in position, to encompass shaft coupling member 20. Drive coupler 48 is shaped to fit within male funnel 42 and when male funnel 42 is positioned within female funnel 40, drive coupler 48 may at least partially cover shaft coupling member 20 and allow slot 56 to receive drive pin 24.

Figure 6:
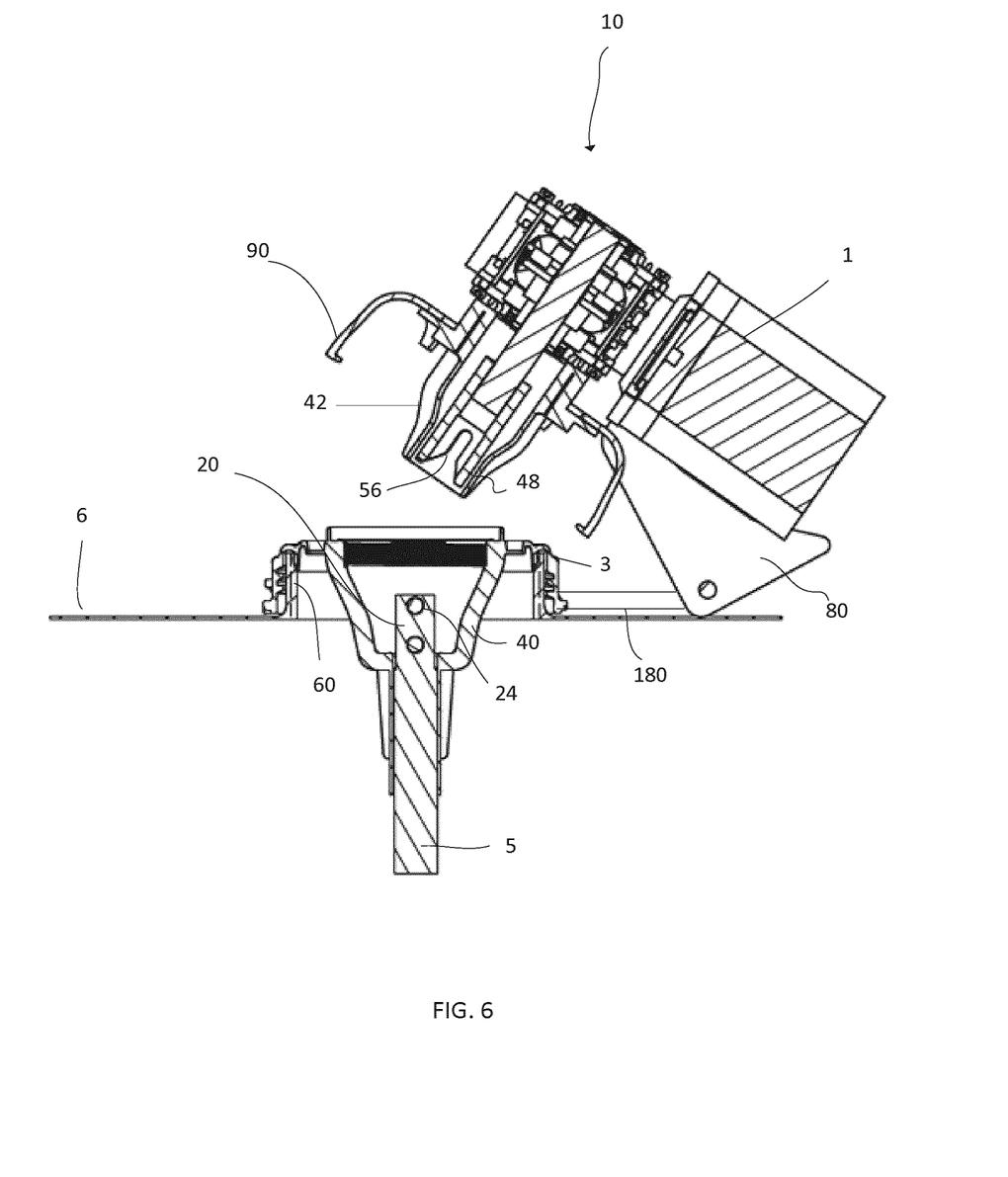
FIG. 6 is a side cross sectional view of an embodiment of an assembly according to the invention.
Figure 7:
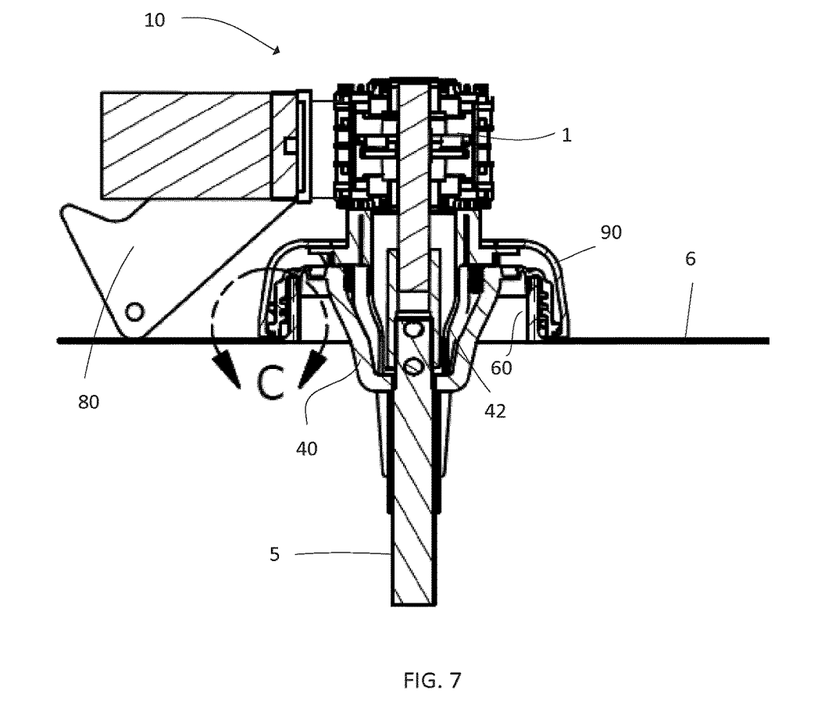
FIG. 7 is a side cross sectional view thereof in an engaged position.
Figure 8:
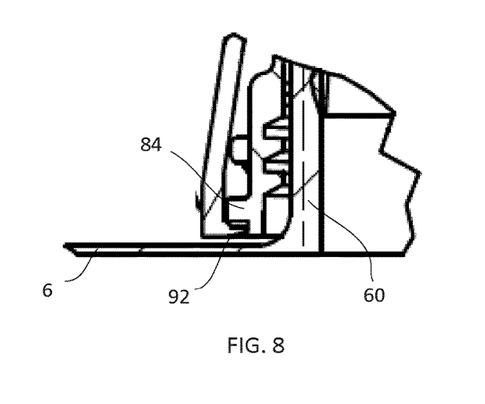
FIG. 8 is a detail view of C in FIG. 7, showing a locking member according to the invention.

Rocking frame 80 is positionable on the top of container 6 and frame 80 may use the top surface of container 6 as a fulcrum. Frame 80 can be placed in a variety of locations on container 6. Rocking frame 80 is secured to drive 1 and is sized and positionable to allow drive coupler 48 to be led by funnel 40 to shaft coupler 20. Rocking frame 80 may include an arm 180, as shown in FIG. 6, for use in positioning frame 80 so that drive coupler 48 is alignable with shaft coupler 20. Arm 180 is configured with cover 3 to align drive coupler 48 and shaft coupler 20.

Figure 9:
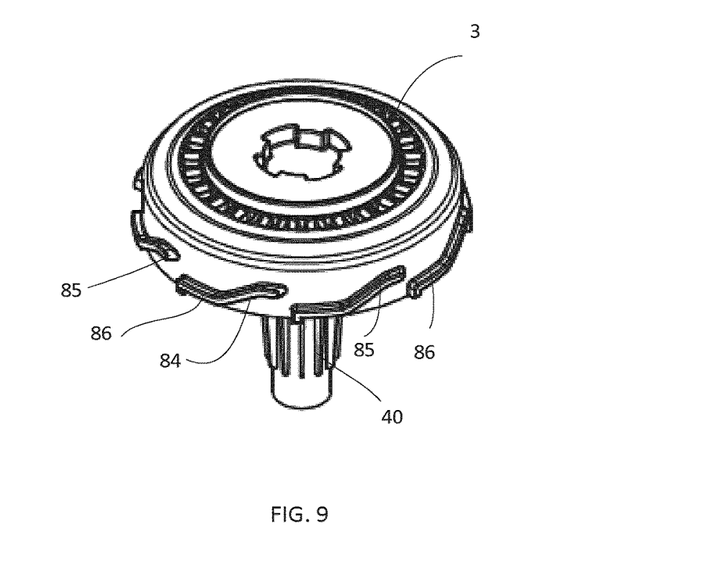
FIG. 9 is a perspective view of an embodiment of a cover according to the invention.

In an embodiment of the invention, cover 3 has a plurality of extensions 84 as seen in FIG. 9 to assist in securing drive 1 to cover 3. Extensions 84 are shaped having an upper portion 85 and a lower portion 86 to receive locking members 90 extending downwardly from rotatable member 112. Locking members 90 include inward extension 92 for positioning below extension 84 and thereby hold and keep drive 1 in position when engaging shaft 5. Locking members 90 are positionable below upper portion 85 of extension 84, and when rotatable member 112 is turned locking members 90 rotate and extension 92 slides downwardly to lower portion 86. Once positioned at lower portion 86, locking members 90 hold the drive 1 to the agitator segment by compression.

Figure 3:
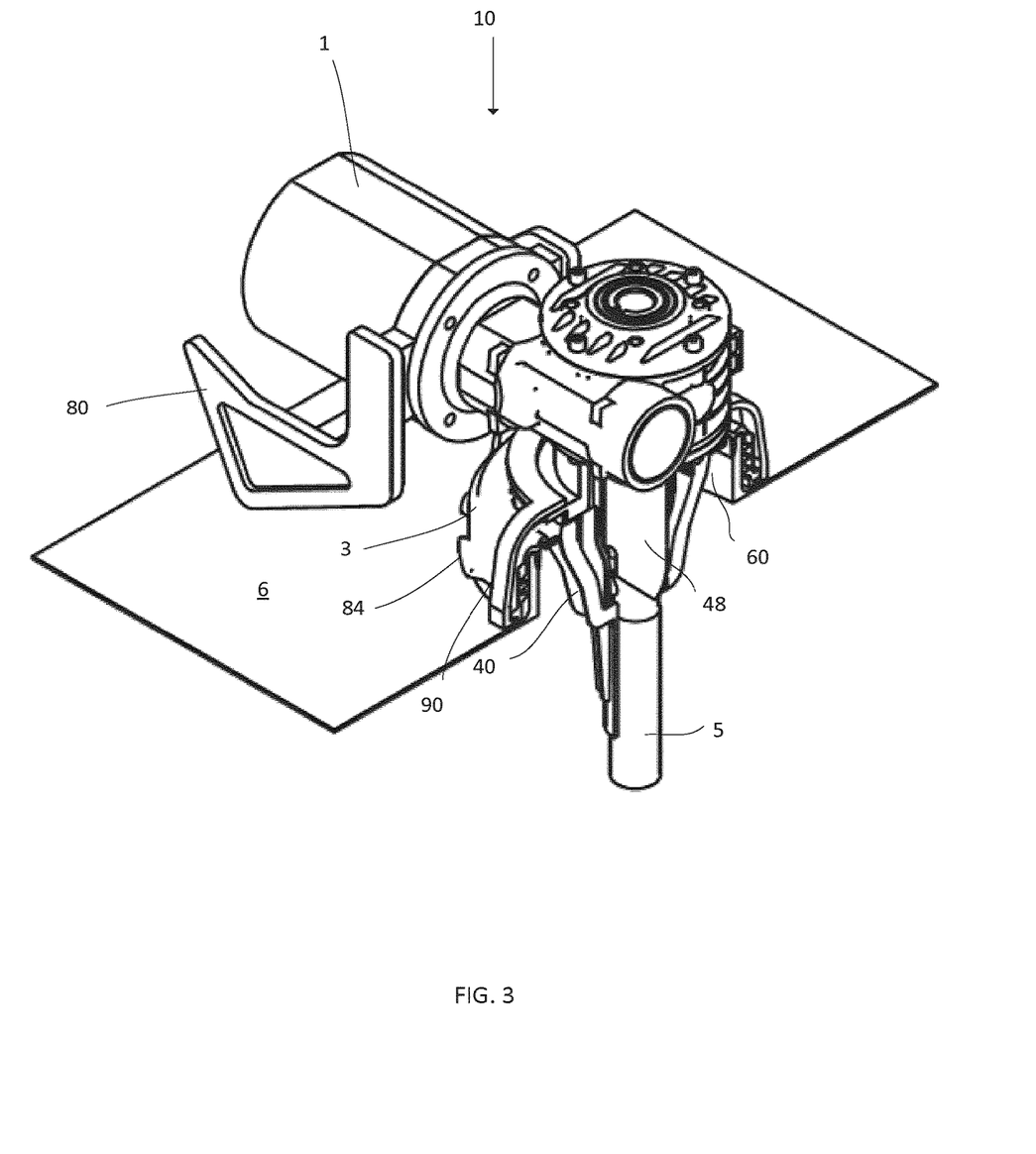
FIG. 3 is a perspective view of the embodiment of the assembly according to the invention in an engaged position.
Figure 4:
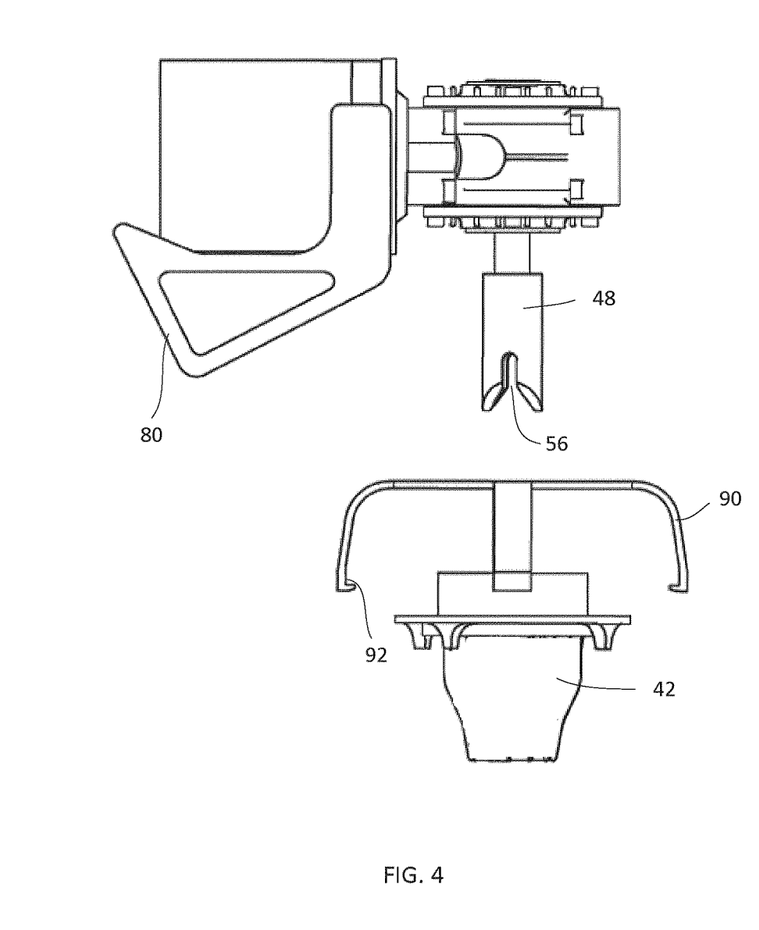
FIG. 4 is a side view of an embodiment of a disassembled assembly according to the invention in an unengaged position.
Figure 5:
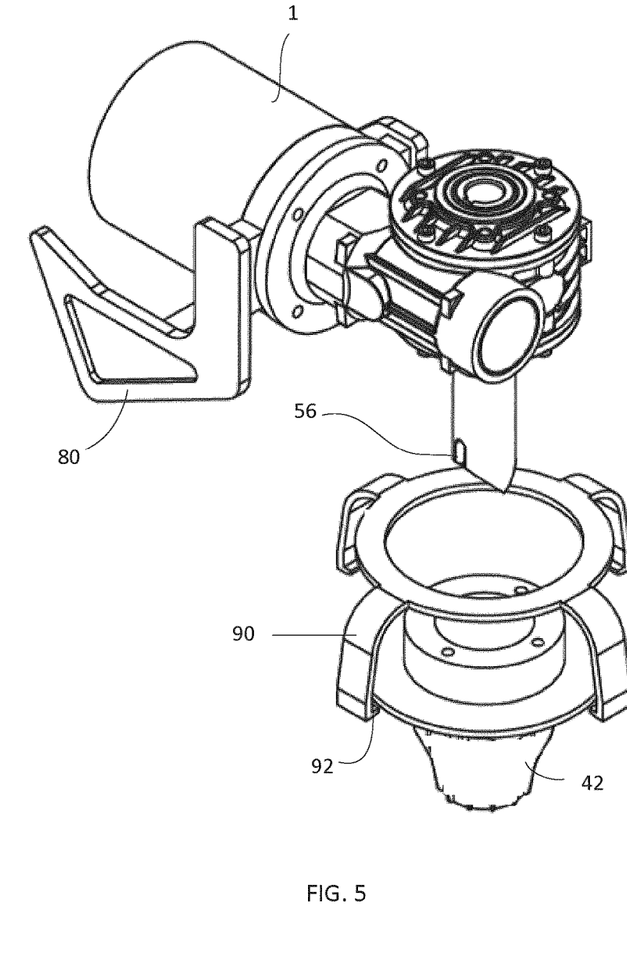
FIG. 5 is a perspective view thereof.

As shown in FIG. 3, in use drive coupler 48 is lowered and guided by funnel 40 and rocking frame 80 onto coupling member 20 such that coupling pin 24 is received by slot 56. Male drive coupler 48 engages coupling member 20. Locking members 90 are positioned beneath extensions 84. Drive 1 can then be actuated to rotate shaft 5.

The assembly as described above is usually manufactured of plastic and/or metal. In an embodiment of the invention the materials used should be selected with a consideration of electrostatic properties, so that electrical charge is not accumulated or is dissipated from the mixing assembly 10.

Figure 10:
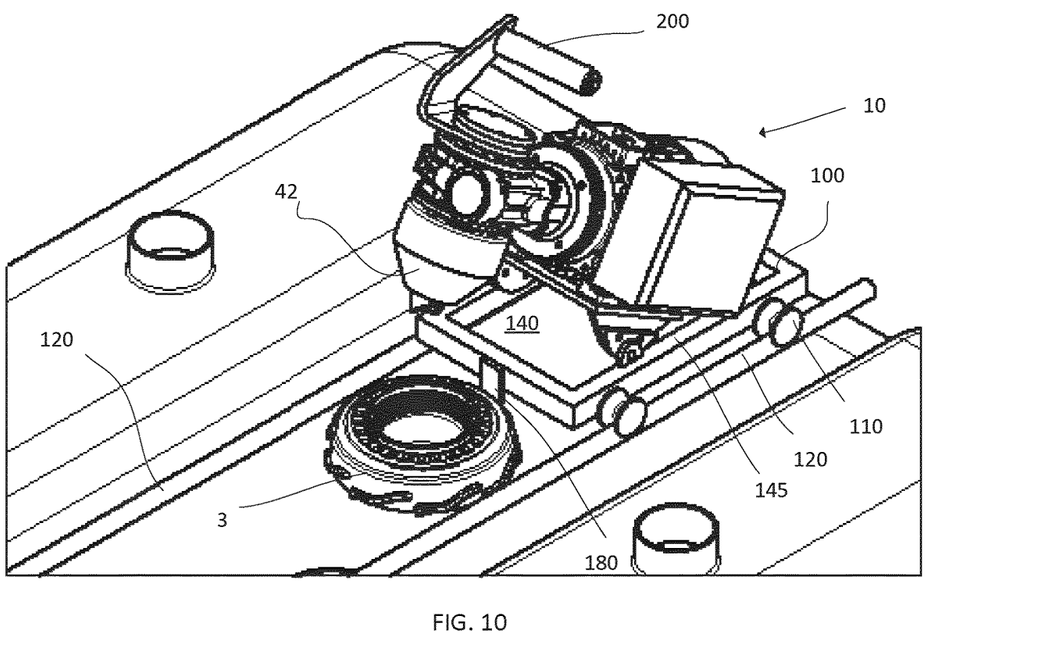
FIG. 10 is a top perspective view of an alternative embodiment of the invention wherein the mixing assembly is mounted on a moveable frame for delivery and positioning of the drive.
Figure 11:
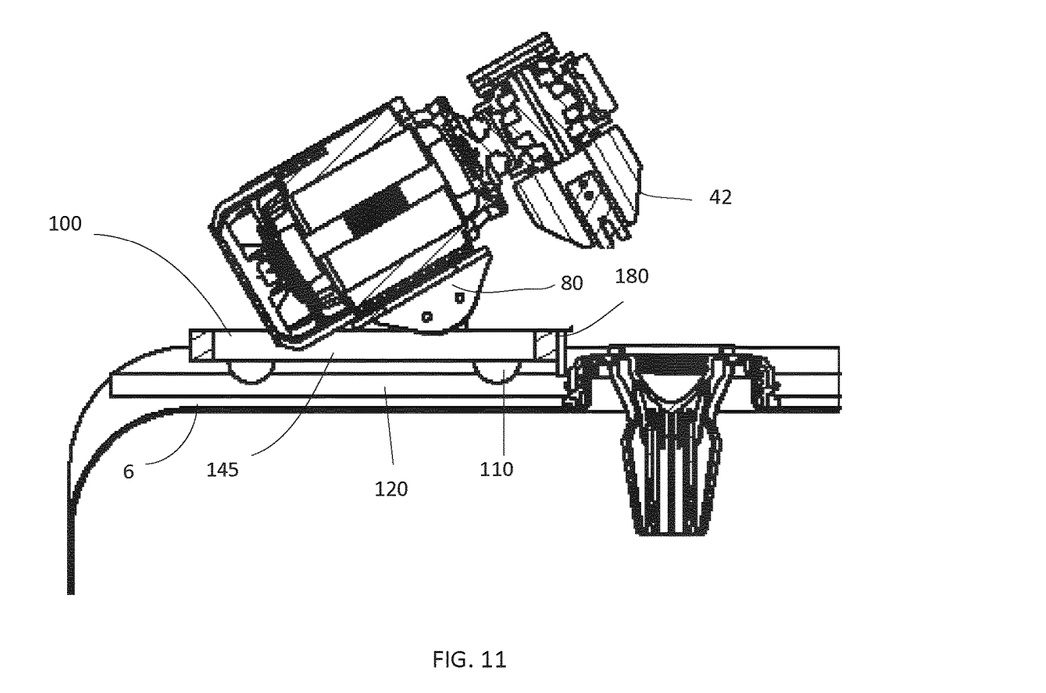
FIG. 11 is a cross sectional side view thereof.

In an alternative embodiment of the invention, assembly 10 may be mounted on moveable frame 100. Moveable frame 100, as shown in FIGS. 10 and 11, may be a generally flattened surface 140 with raised edges 145 and may include concave rollers 110 sized and positioned to roll on spars 120, which are often positioned on containers 6. In an alternative embodiment, frame 100 may be slidable along spars 120 without the use of rollers 110. Handle 200 may be present and used to roll or pivot assembly 10. Rollers 110 can be used to align drive 1 with funnel 40. The width of the concave wheels 110 are broader than the diameter of spars 120 to allow for ease of placement. Concave wheels 110 will naturally center on spars 120 once placed.

Moveable frame 100 can thus roll on the top surface of container 6 towards or away from cover 3. Rocking frame 80 is pivotably secured to moveable frame 100 and may be pivotably mounted to opposed edges 145 of moveable frame 100. Moveable frame 100 can be moved to position drive 1 to be received by funnel 40. Moveable frame 100 is sized to position drive 1 so that when rocking frame 80 is pivoted, drive coupler 48 is positioned to be led by funnel 40 to shaft coupler 20.

Moveable frame 100 may include trigger 180 which may be actuatable on contact with a side of cover 3 and which on actuation, releases rocking frame 80 to pivot. The actuation of trigger 180 occurs when moveable frame 100 is in position for drive coupler 48 to be led into funnel 40. Trigger 180 may be configured to release a latch (not shown) when actuated thereby allowing rocking frame 80 to pivot.

Although the particular preferred embodiments of the invention have been disclosed in detail for illustrative purposes, it will be recognized that variations or modifications of the disclosed apparatus lie within the scope of the present invention. For example, the invention can be implemented using a variety of seals, valves, materials, bearings, bushings, impellers, shafts, motors and gearboxes.

As will be apparent to those skilled in the art, the elements of the various embodiments described above can be combined or removed to provide further embodiments. Aspects of the present systems, methods and components can be modified, if necessary, to employ systems, methods, components and concepts to provide yet further embodiments of the invention. For example, the various methods described above may omit some acts, include other acts, and/or execute acts in a different order than set out in the illustrated embodiments.

These and other changes can be made to the present systems, methods and articles in light of the above description. In general, in the following claims, the terms used should not be construed to limit the invention to the specific embodiments disclosed in the specification and the claims, but should be construed to include all possible embodiments along with the full scope of equivalents to which such claims are entitled. Accordingly, the invention is not limited by the disclosure, but instead its scope is to be determined entirely by the following claims.

While certain aspects of the invention are presented below in certain claim forms, the inventors contemplate the various aspects of the invention in any available claim form.

We claim:

1. A mounting assembly for a container, comprising:
   a drive coupler shaped to engage a coupling member on a drive shaft; the drive coupler having a groove to engage a locking pin on the coupling member; the drive coupler within a male funnel;

a cover for the container, the cover defining an aperture to allow passage of the shaft;
a drive shaft partially covered by the drive coupler, the drive shaft rotatable by a motor; and
a female funnel positioned within the cover to receive the drive coupler and guide the drive coupler to the coupling member.

2. The mounting assembly of claim 1 wherein the drive coupler is shaped to be received by the funnel.

3. The mounting assembly of claim 1 wherein the drive coupler and motor are secured to a rocking frame configured to use a surface on the container as a fulcrum.

4. The mounting assembly of claim 1 wherein the cover comprises an extension on an exterior of the cover, and the drive coupler further comprises a locking member securable to the extension.

5. The mounting assembly of claim 3 wherein the cover is sized to serve as a guide for positioning of the rocking frame for alignment of the drive coupler and coupling member.

6. A mounting assembly, comprising:
i. a drive coupler shaped to engage a coupling member on a shaft positionable within a container, the container defining an aperture to allow passage of the shaft, wherein the drive coupler is mounted to a moveable frame;
ii. a first funnel positioned within the aperture to receive the drive coupler and guide the drive coupler to the coupling member,
wherein the moveable frame is moveable from a first position wherein the drive coupler is not positionable to receive the coupling member to a second position wherein the drive coupler is positionable to receive the coupling member, and
wherein the frame further comprises an actuator, which when actuated, allows pivoting of the drive coupler.

7. The mounting assembly of claim 6 wherein the actuator is configured to actuate when the drive coupler is positionable to be received by the funnel.

8. The mounting assembly of claim 6 wherein the drive coupler is rotatable by a motor.

9. The mounting assembly of claim 8 wherein the frame further comprises a plurality of concave rollers sized and positioned to roll along at least two spars on the container.

10. The mounting assembly of claim 9 wherein the container comprises a neck surrounding the aperture.

11. The mounting assembly of claim 9 further comprising a cover positionable within the aperture.

12. The mounting assembly of claim 11 wherein the cover comprises an extension on an exterior of the cover, and the drive coupler further comprises a locking member securable to the extensions.

13. The mounting assembly of claim 12 further comprising an impeller secured to the shaft.

14. A mounting assembly, comprising:
i. a drive coupler shaped to engage a coupling member on a shaft positionable within a container, the container defining an aperture to allow passage of the shaft;
ii. a first funnel positioned within the aperture to receive the drive coupler and guide the drive coupler to the coupling member,
wherein a mixer is configured to dissipate electrostatic charge.

15. A mounting assembly, comprising:
i. a drive coupler shaped to engage a coupling member on a shaft positionable within a container, the container defining an aperture to allow passage of the shaft;
ii. a first funnel positioned within the aperture to receive the drive coupler and guide the drive coupler to the coupling member; and
iii. a second funnel surrounding the drive coupler and configured to be received by the first funnel.

16. A mounting assembly, comprising:
a drive coupler shaped to engage a coupling member on a shaft positionable within a container, the container defining an aperture to allow passage of the shaft; the drive coupler positioned on a moveable frame moveable from a first position wherein the drive coupler is not positionable to receive the coupling member to a second position wherein the drive coupler is positionable to receive the coupling member; the frame comprising an actuator, which when actuated, allows pivoting of the drive coupler, the actuator actuatable when the drive coupler is pivotably alignable with the coupling member.

* * * * *